INVENTOR.
JOSEPH A. WEISBECKER
BY
[signature]
ATTORNEY

Feb. 8, 1966 | J. A. WEISBECKER | 3,234,521

DATA PROCESSING SYSTEM

Filed Aug. 8, 1961 | 6 Sheets-Sheet 2

INVENTOR.
JOSEPH A. WEISBECKER
BY [signature]
ATTORNEY

LEGEND:
⫽ BUS
— CONDUCTOR

INVENTOR.
JOSEPH A. WEISBECKER
BY Samuel Cohen
ATTORNEY

Feb. 8, 1966 J. A. WEISBECKER 3,234,521

DATA PROCESSING SYSTEM

Filed Aug. 8, 1961 6 Sheets-Sheet 4

INVENTOR.
JOSEPH A. WEISBECKER
BY
Samuel Cohen
ATTORNEY

INVENTOR.
JOSEPH A. WEISBECKER
BY
ATTORNEY

INVENTOR.
JOSEPH A. WEISBECKER
BY [signature]
ATTORNEY

United States Patent Office 3,234,521

Patented Feb. 8, 1966

3,234,521

DATA PROCESSING SYSTEM

Joseph A. Weisbecker, Erlton, N.J., assignor to Radio Corporation of America, a corporation of Delaware Filed Aug. 8, 1961, Ser. No. 130,081
11 Claims. (Cl. 340—172.5)

This invention relates to data processing. More particularly, the invention relates to a data processing system whose internal memory includes some defective storage locations.

Random access memories used in modern digital computers are made up of arrays of storage units such as ferrite cores, thin films, ferrite plates, metal sheets, or other elements. It is both difficult and costly to make such memories in which all elements are "good" elements. Cores, for example, are small and brittle and are easily damaged in the process of threading the drive and sense windings through the cores. Even if such damage is detected before the array is completed, it is extremely difficult to repair. For example, consider the problem of attempting to repair a defective 50 bit word storage location, the 25th core of which has become damaged when threading the third winding through that core.

In spite of the above, both computer manufacturers and users at present insist upon memories which exhibit no imperfections or discontinuities. The reason is that such memories permit a high degree of programming and data processing efficiency.

If an imperfect memory were directly substituted for an existing perfect memory in a computer, discontinuities in the number sequence of useable locations would appear to the computer and/or the programmer. There has not, as yet, been any practical solution to the problems of programming around the memory discontinuities and/or of developing processing circuits which can cope with these discontinuities. This is particularly true in the case of mass produced computers.

One might attempt to modify the memory address decoder of a computer in such a way that the decoder would accept an address of a defective memory location and would apply to the memory the address of a substitute "good" memory location instead. This approach would, in effect, require that the decoder circuits lends themselves readily to physical modification. It would also require that the decoder circuits be of the type which permit specific individual word locations readily to be bypassed. Practical memory address decoders do not have these characteristics.

Further, even if the approach above were practical, it would mean that each computer of the same model number would have a differently wired memory address decoder and also a different interconnection pattern between the memory address decoder and the memory. There are a number of reasons, not necessary to discuss in detail here, why this would make the job of maintaining the computer after it was in the field exceedingly difficult. In any case, this approach has not been accepted or adopted as a practical one which would permit the use of imperfect arrays of memory elements.

As one would expect, there is a high price involved in satisfying the requirement for a perfect array of memory elements. The objective of this invention is to provide a data processing system which permits one to use a lower cost memory, that is, one in which some defective storage locations exist.

The system of the invention automatically bypasses the defective memory words and, at the same time, prevents the resulting discontinuities in memory address sequences from being reflected into the computer proper or from affecting the program of the computer. The invention includes a storage medium which stores the addresses of all defective locations in the memory. The address word applied to the memory is compared with all words in the storage medium and, if an equality exists, a substitute address word, this one corresponding to a good storage location, is applied to the memory. The entire procedure is automatic and interferes neither with the programming of the memory nor with other operations in the computer.

The invention is described in greater detail below and is illustrated in the following drawings of which:

Similar reference numerals are applied to similar system components throughout the figures.

The blocks shown in the various figures are in themselves known circuits. The circuits of the blocks are actuated by electrical signals. When a signal is at one level, it represents the binary digit "one" and when it is at another level, it represents the binary digit "zero." For the sake of the discussion which follows, it may be assumed that a positive signal represents the binary digit "one" and a negative signal represents the binary digit "zero," however, this assumption is purely arbitrary. Also to simplify the discussion, rather than speaking of an electrical signal being applied to block or logic stage, it is sometimes stated that a "one" or a "zero" is applied to a block or logic stage.

Throughout the figures capital letters, either singly or in combination, and small letters are used to represent the signals indicative of binary digits. In some cases, a capital letter represents a word made up of binary digits. For example, INC represents a binary digit. $Y_1$ represents a word made up of binary digits. X represents a word made up of binary digits.

The flip-flops shown have set and reset inputs and "one" and "zero" outputs. The convention is adopted that when a flip-flop is set, its 1 output terminal becomes relatively high representing the presence of binary digit "one." When a flip-flop is reset, its 0 output terminal becomes relatively high representing the presence of the binary digit "zero." The two outputs always have complementary levels, i.e., when one is high, the other is low. One of the flip-flops shown also has a trigger input terminal T. When a pulse is applied to a trigger input terminal, the flip-flop changes its state.

For the sake of simplifying the discussion, many of the conventional elements required for the operation of the circuits shown are either implied or are combined into a single block. For example, as is understood by those skilled in the art, the block legended "memory" includes a memory address register, a memory address decoder, a matrix of storage elements, and a memory register.

The normal timing cycle shown for the computer is simplified. Only two timing pulses are shown, $T_1$ which initiates the read cycle, and $T_2$ which initiates the write cycle.

Figure 1:
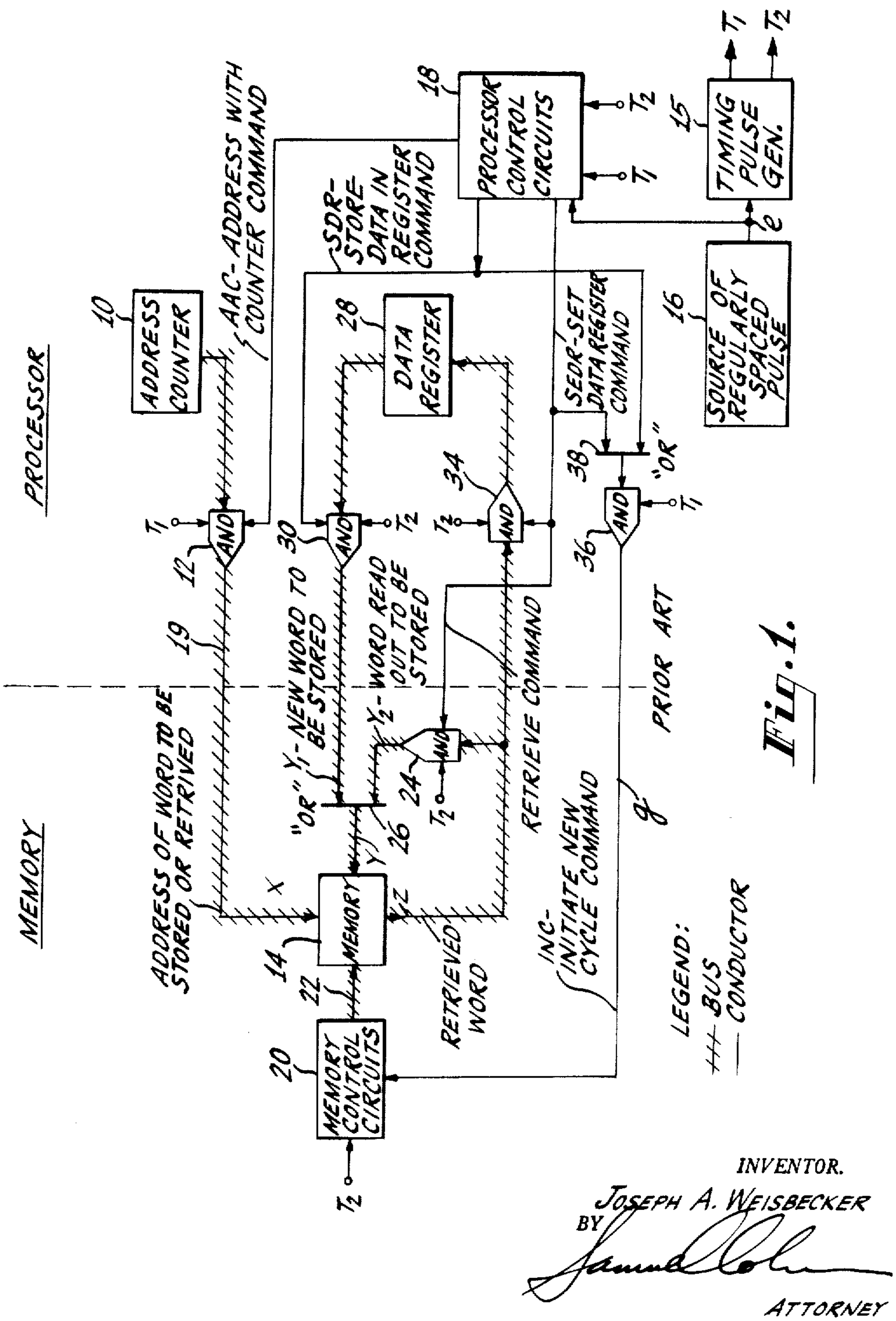
FIG. 1 is a block circuit diagram of a prior art memory and processor.

A prior art memory and its processor are illustrated in FIG. 1. The processor includes an address counter 10 which stores a binary word of *a* digits indicative of a memory address. Thus, the counter is capable of storing any one of $2^a$ different addresses. In general, the address counter advances its position one binary digit (bit) at a time.

The address stored in the counter 10 is applied to an "and" gate 12. If, at the same time, two other signals are present, namely $T_1$ and AAC, the address passes through the "and" gate 12 and is applied to the memory 14. The signal $T_1$ is a timing signal. It is produced by a timing pulse generator 15 shown at the lower right which, in turn, is synchronized by the clock pulses *e* produced by the source 16. The signal AAC is produced by the processor control circuits 18. The latter is synchronized by the clock pulse source 16 and produces various control voltages required for the operation of the computer, as specified by a stored sequence of instructions, known as a program.

The configuration of bits in the address word applied to the memory via bus 19 uniquely specifies one particular memory location. This configuration of bits—an address word, is decoded by the memory address decoder in block 14 and employed to select a unique word location. The block 14 includes an address register for storing the address word which is decoded. This address register is reset by any suitable means prior to each memory cycle, as by a timing pulse, such as a delayed timing pulse $T_2$.

For the sake of the present discussion, it may be assumed that the memory is made up of ferrite cores, however, it is to be understood that other types of memory elements may be employed instead. The selection of a word location implies that a selection current is applied to all the cores which store that word in a sense to reset all of these cores. It may be assumed that each word is made up of *d* bits so that *d* cores receive the reset current. (The value of *d* depends upon the size of the memory, however, it can be 20, 30, 50 or more bits.) The initial resetting of the cores in a given word causes the bit configuration previously stored at the memory location specified by the address word to appear, at a later time, at the memory output Z. These bits appear in parallel. They may be applied through a gate such as "and" gate 34 to one of the registers such as 28 in the computer.

The sequence of events above constitutes the read cycle of the memory. It is initiated at a time corresponding to that at which the $T_1$ pulse appears.

The time at which the stored contents of a word location becomes available at the output Z is the time at which a pulse $T_2$ appears. The pulse $T_2$ is produced a fixed interval of time after the pulse $T_1$ and is generated by the same timing pulse generator 15 which generates $T_1$. The difference in time between pulse $T_1$ which initiates the read cycle and pulse $T_2$ includes that time required to perform the sequence of events involved in the read portion of the memory cycle.

The second portion of the memory cycle is that in which the storage of a data word in the selected memory location (the memory location selected by the address counter 10) occurs. This portion is initiated by $T_2$ applied to the memory control circuits 20. This is referred to as the "write" portion of the memory cycle. The word to be stored is presented in parallel at memory input Y at the time at which pulse $T_2$ occurs. This time follows the read portion of the memory cycle. The currents which represent the binary bits of the word to be stored operate to set the cores of the selected word location to conform to the bit configuration of this word.

The word to be stored can be the originally stored word appearing at the output Z which was erased from the memory during the read portion of the cycle. The regenerative feedback loop for accomplishing such storage includes "and" gate 24 and "or" gate 26. The "and" gate is enabled in response to a pulse $T_2$ and a retrieve command SEDR (set data register) supplied by the processor control circuits 18. Alternative to the above, the word stored can be a new word supplied from a source external to the memory. This is illustrated in FIG. 1 as a word stored in a data register 28. In order to store such a word the processor control circuits produce one output SEDR=0 and a second output SDR (store data in register command)=1. When SDR=1 and $T_2$ is present, "and" gate 30 is enabled and the word stored in the data register is applied through "and" gate 30 and "or" gate 26 to the memory 14. The difference in time between the occurrence of pulse $T_2$ and the next pulse $T_1$ is that time required to complete the write portion of a memory cycle.

A new cycle is initiated when "and" gate 36 produces an output INC. This "and" gate produces an output when it receives an input from "or" gate 38 at the same time as it receives a pulse $T_1$. "Or" gate 38 receives the SEDR and the SDR outputs of the processor control circuits 18. Accordingly, a new cycle is initiated either after the word read out of the memory is stored back to the memory or after a new word is stored in the memory.

Figure 2:
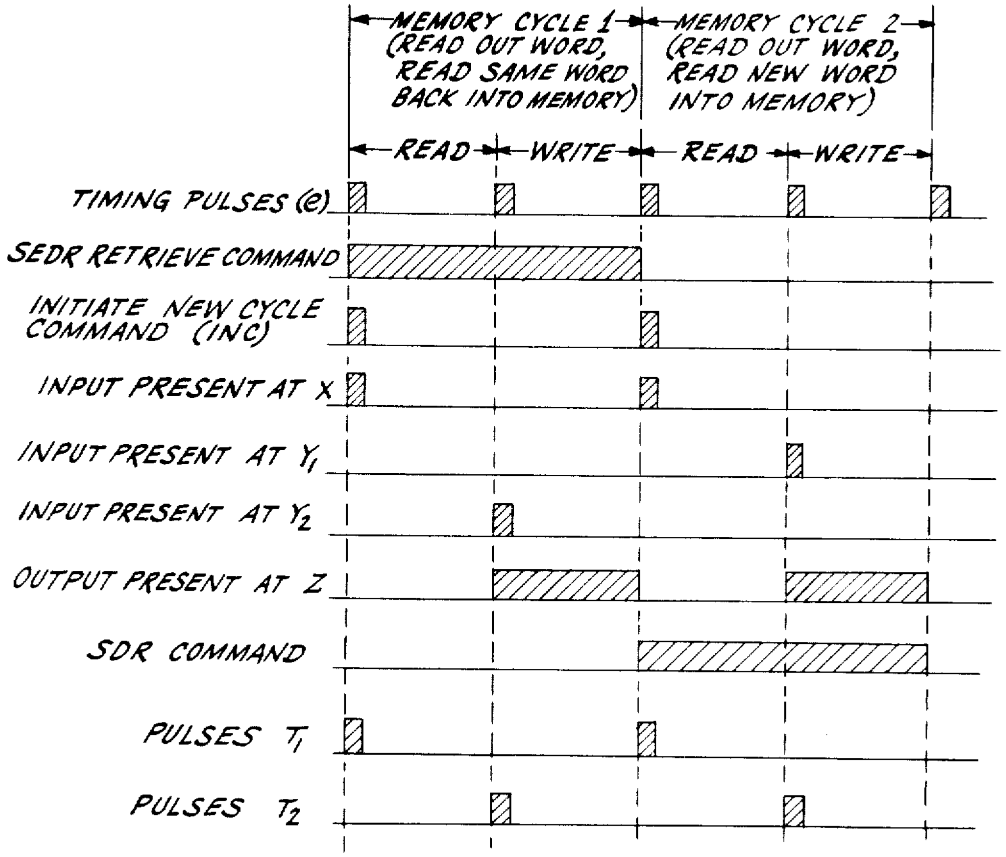
FIG. 2 is a timing diagram to help explain the operation of the system of FIG. 1.

The sequence of events discussed above is illustrated in the timing diagram of FIG. 2. The timing pulses *e* are synchronous pulses, that is, they occur fixed intervals from one another. The initiate new cycle command INC occurs at the time at which pulse $T_1$ occurs. The retrieve command SEDR is initiated by the processor control circuits 18 when it is desired to store the same word in the memory that has just been read out. This command begins at a time corresponding to $T_1$ and is maintained on during a complete read-write cycle. The SDR command is initiated by the processor control circuits during the memory cycle at a time corresponding to a timing pulse $T_1$ and it can remain on during one entire memory cycle.

A typical data processing system may include many address counters 10 and many data registers 28. Nevertheless, for the sake of drawing simplicity, only one of each is shown in FIG. 1. Further, the "and" gates shown which are connected to buses actually consist of a plurality of "and" gates, each receiving one bit. The timing signals such as $T_1$ or $T_2$ are applied in parallel to all of the gates. The control signals from the processor control circuits are also applied in parallel to all of the gates.

Figure 3:
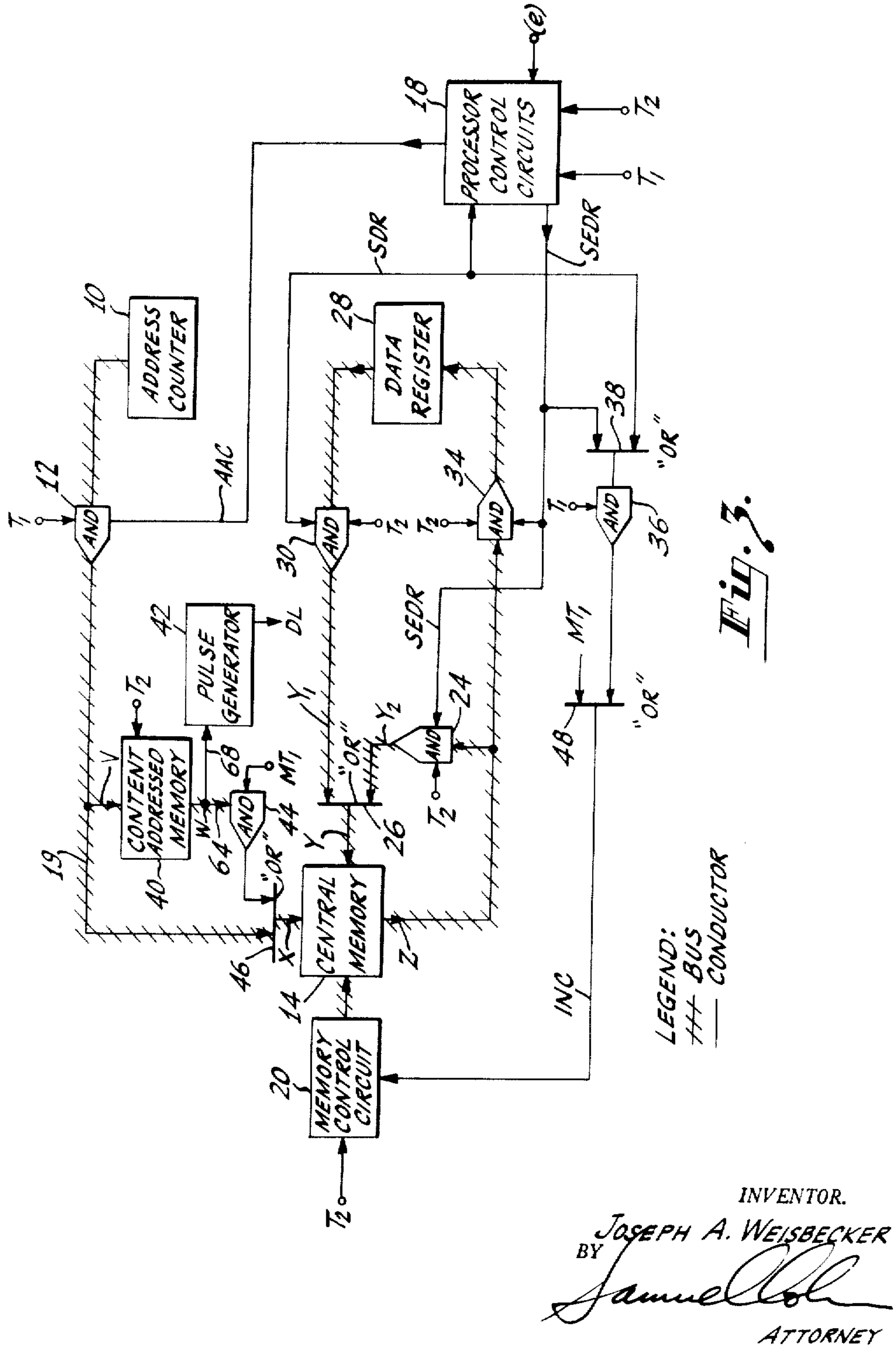
FIG. 3 is a block circuit diagram of the system of FIG. 1 modified according to the teachings of the present invention.

A system which embodies the present invention is illustrated in FIG. 3. It includes all of the circuit elements of FIG. 1 and these have the same reference numerals applied. In addition, the circuit of FIG. 3 includes a content addressed memory 40 connected to receive the address word appearing on bus 19. A content addressed memory is one which, in response to an input word which is equal to a portion of a word stored in the content addressed memory, produces an output word.

The particular content addressed memory employed here stores the addresses of all the defective word locations in the central memory. The defective addresses in the memory may be located by appropriately programming the machine. For example, known bit patterns may be read into the successive memory locations and subsequently read out. Those locations which produce output words containing errors may be assumed to be defective. In general, the number of defective addresses in the memory is relatively small. For example, in the case in which the memory stores 10,000 or so words, it may be assumed for purposes of illustration that there will be no more than 500 defective addresses. The incoming address is compared with the defective addresses stored in the content address memory 40 and, when an equality exists, the content addressed memory produces a substitute output address for the central memory 14. The content addressed memory also produces an output pulse which is applied to the pulse generator 42. The pulse generator 42 produces an output pulse DL in response to an input pulse. The pulse DL is used to generate a different sequence of timing pulses and also may be used to reset the address register of the memory 14.

The system of FIG. 3 also includes an "and" gate 44 which, under certain conditions, applies a substitute word through "or" gate 46 to the central memory 14. Finally, the system of FIG. 3 also includes an "or" gate 48 the purpose of which will be discussed shortly.

Figure 4:
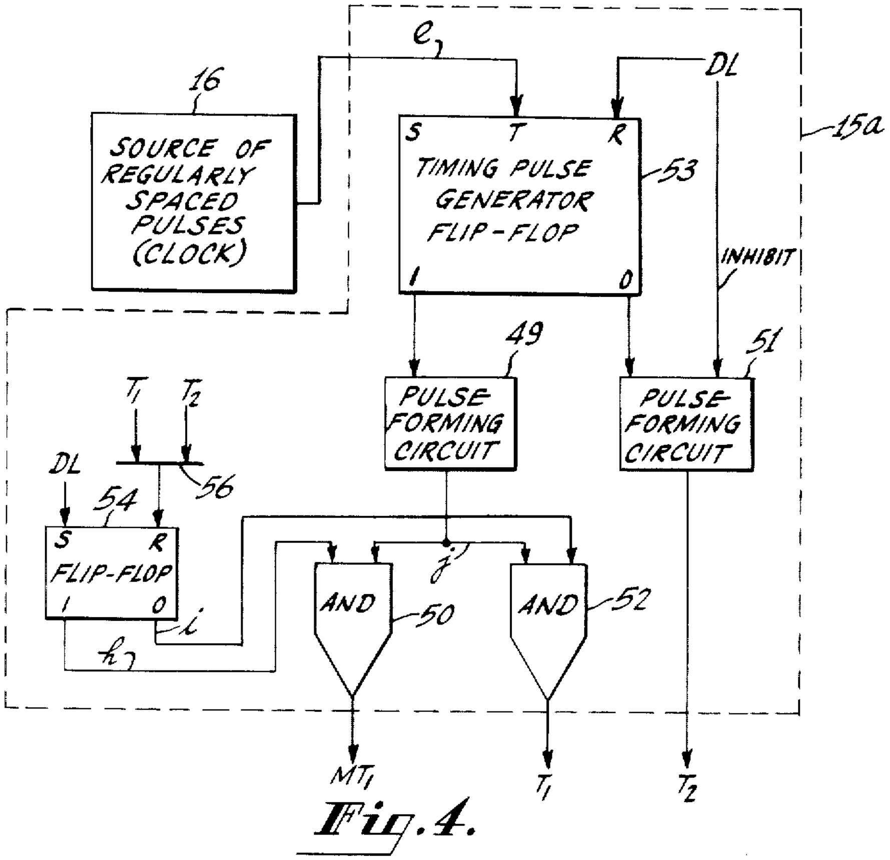
FIG. 4 is a block circuit diagram of certain control circuits associated with the circuit of FIG. 3.

Certain control circuits for the system of FIG. 3 are illustrated in FIG. 4. The source of regularly spaced pulses 16 is analogous to the like numbered stage of FIG. 1. The timing pulse generator 15*a* includes a flip-flop 53 having a reset input terminal R to which the pulse DL from pulse generator 42 is applied and a trigger input terminal T to which the clock pulses *e* are applied. The 1 output terminal of the flip-flop 53 is connected to pulse forming circuit 49. The pulse forming circuit 49 may, for example, include a differentiator for producing a positive pulse coincidentally with the leading edge of the positive (binary "one") output of the 1 output terminal. The differentiator may be followed by a network such as a blocking oscillator or other wave shaping circuit for producing a short duration positive pulse each time terminal 1 goes positive.

The 0 output terminal of the flip-flop is connected to a pulse forming circuit 51 which is similar in structure and function to the pulse forming circuit 49. It produces an output pulse $T_2$ each time the 0 terminal goes positive.

The circuit 15*a* also includes a flip-flop 54. The pulse DL from generator 42 (FIG. 3) is applied to the set (S) terminal of this flip-flop. The pulses $T_1$ and $T_2$ are applied to the reset (R) terminal of the flip-flop 54 through "or" gate 56.

The final elements of the timing pulse generator 15*a* are "and" gates 50 and 52. "And" gate 50 receives a signal *h* from the the 1 terminal of flip-flop 54 and a signal *j* from the pulse forming circuit 49. "And" gate 52 receives a signal *i* from the 0 output terminal of flip-flop 54 and also the signal *j*.

Assume flip-flops 53 and 54 initially to be reset. In the absence of a pulse DL, the first trigger pulse *e* sets flip-flop 53. The pulse forming circuit 49 thereupon applies a positive pulse *j* to the "and" gates 50 and 52. The signal *i* is positive and the signal *h* is negative, therefore, "and" gate 52 is enabled and "and" gate 50 is disabled. The enabled gate 52 produces a $T_1$ output pulse.

Pulse $T_1$ is applied through "or" gate 56 to the reset terminal R of flip-flop 54. This maintains this flip-flop reset. The next timing pulse *e* resets flip-flop 53, whereupon the pulse forming circuit 51 produces a $T_2$ output pulse. During this interval the pulse *j* is not present so that "and" gates 50 and 52 are disabled.

To summarize, in the absence of DL, the timing cycle is $T_1$, $T_2$. This cycle continues to be repeated.

Assume now the same starting conditions, namely flip-flops 53 and 54 reset. Assume also that the timing pulse $T_1$ has been generated so that flip-flop 53 is set and flip-flop 54 remains reset. Immediately before the next timing pulse *e* occurs, a pulse DL appears. This sets flip-flop 54 and resets flip-flop 53. The pulse DL is also applied as an inhibit signal to the pulse forming circuit 51 to prevent circuit 51 from generating an output pulse $T_2$. The inhibit circuit may include a gate (not shown) in series with the lead from the 0 terminal of flip-flop 53, the inhibit signal being applied to an inhibit terminal of the gate.

The next timing pulse *e* now sets flip-flop 53. A pulse *j* is thereupon produced by pulse forming circuit 49. Fip-flop 54 has been set so that *h* is positive and *i* is negative. Accordingly, "and" gate 50 is enabled and an output $MT_1$ appears.

Figure 5:
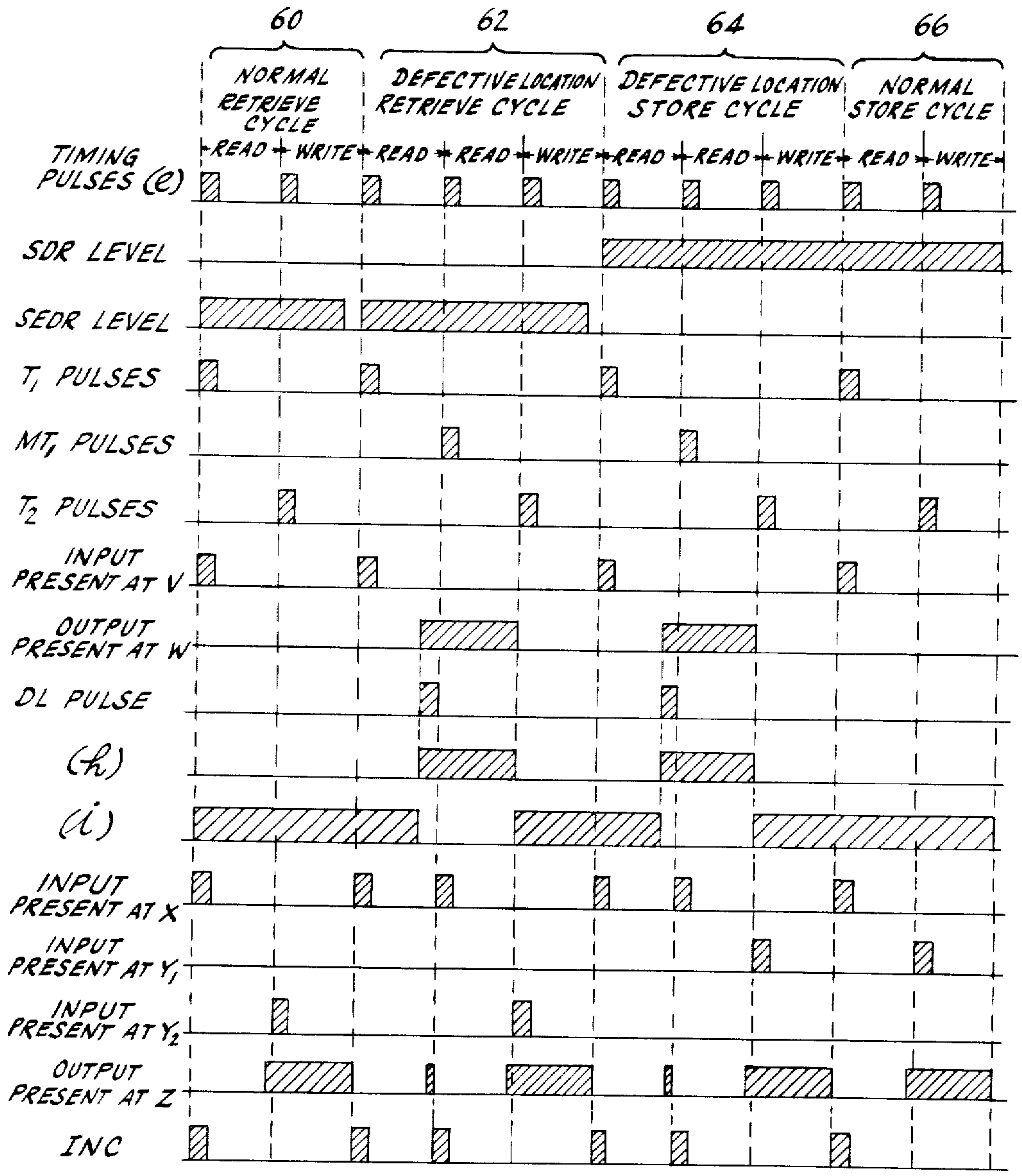
FIG. 5 is a timing diagram to help explain the operation of the system shown in FIGS. 3 and 4.

The input pulse DL is removed when $MT_1$ appears (see FIG. 5). The next timing pulse *e* after $MT_1$ resets flip-flop 53 whereupon the 0 output terminal of 53 becomes positive. Now circuit 51 produces an output pulse $T_2$. $T_2$ resets flip-flop 54 so that the circuit 15*a* is now in its original condition.

Summarizing, when a pulse DL appears after pulse $T_1$ has occurred and shortly before the following timing pulse *e* occurs, the timing pulses produced by circuit 15*a* are $T_1$, $MT_1$, $T_2$ in that order.

The operation of the circuits of FIGS. 3 and 4 may be better understood by referring also to the timing diagram of FIG. 5. A normal retrieve cycle (read word from memory, store same word back in memory) is illustrated in column 60 of FIG. 5. The timing pulses are as shown at *e*. The SDR (store data in register) command is "zero." The SEDR (set data register) command is "one." The AAC (address with counter) command is "one."

The first pulse *e* results in the generation of timing pulse $T_1$. Upon receipt of the pulse $T_1$, the address stored in counter 10 passes through "and" gate 12 and is applied through "or" gate 46 to the X input to the central memory. At the same time this address is applied to input V of the content addressed memory. The address is a "good" address in the memory it has not been previously stored in the content addressed memory and no output appears at the output W of the content addressed memory. In the absence of an output at W, the pulse generator 42 produces no output pulse DL. Therefore, the next timing pulse will be $T_2$, as already discussed.

The SEDR=1 output of the processor control circuits is applied through "or" gate 38 and enabled "and" gate 36 to "or" gate 48. "Or" gate 48 produces an INC=1 output as is shown in FIG. 5 and this is applied to the memory control circuits. Accordingly, the conditions are such that all the cores making up the data word addressed by the address word become reset.

When the timing pulse $T_2$ occurs, it is applied to the memory control circuits 20 making the word read out of the memory available at output Z of the memory. This word is applied through "and" gate 34 to the data register 28. This word is also applied through "and" gate 24 which has been enabled by $T_2$ and SEDR, and through "or" gate 26 to the central memory 14. The word is placed back in the same location from which it was read out.

Assume now that the address appearing on bus 19 at time $T_1$ is the address of a defective word location in the memory 14. Assume also that it is desired to go through a retrieve cycle as just described in detail. The sequence of operations which results is shown in columns 62 of FIG. 5.

The address word is applied to the input X of the central memory and is applied to the input V of the content addressed memory. As the word at V is equal to a word previously stored in the content addressed memory, a substitute address appears on the bus 64 during the $MT_1$ pulse. Also, a positive pulse appears at output lead 68. This positive pulse appears before the time corresponding to $T_2$ and it results in an output pulse DL (defective location) from pulse generator 42. Accordingly, the next clock pulse *e* causes a timing pulse $MT_1$ rather than $T_2$ to appear, as already discussed.

Timing pulse $MT_1$ is applied through "or" gate 48 as an INC (initiate new command) signal. $MT_1$ is also applied as an enabling signal to "and" gate 44. Accordingly, the substitute address word from the content addressed memory now passes through "and" gate 44 and through "or" gate 46 to the X input of the central memory. The memory address register in the memory stores this address. As $T_1$ is not present, "and" gate 12 is disabled, thereby isolating the address counter 10 from the memory.

Reviewing for a moment, at time $T_1$ a defective address is applied to the central memory and to the content addressed memory. The content address memory senses that the address is defective and produces a substitute address at W. During the next time period starting at $MT_1$, the substitute address is applied to the memory through "and" gate 44 and "or" gate 46.

The third portion of retrieve cycle is initiated when a third timing pulse *e* is produced by source 16 (FIG. 5). It causes a timing pulse $T_2$ to appear, as already discussed. The pulse $T_2$ is applied to the memory control circuits 20 causing the write portion of the memory cycle to be initiated. The pulse $T_2$ primes "and" gate 24 and "and" gate 34. SEDR is "one." Accordingly, the output word at Z is applied through "and" gate 34 to the data register 28. Simultaneously, the output word is fed back through the regenerative loop which includes "and" gate 24 and "or" gate 26 to the same location in the memory, that is, the substitute location from which it was read out.

The timing diagram for a normal store cycle and a defective store cycle appears in columns 66 and 64 of FIG. 5 respectively. As the explanation of these cycles is straightforward from what has already been discussed, it need not be discussed further. The various waveforms are self-explanatory.

Figure 6:
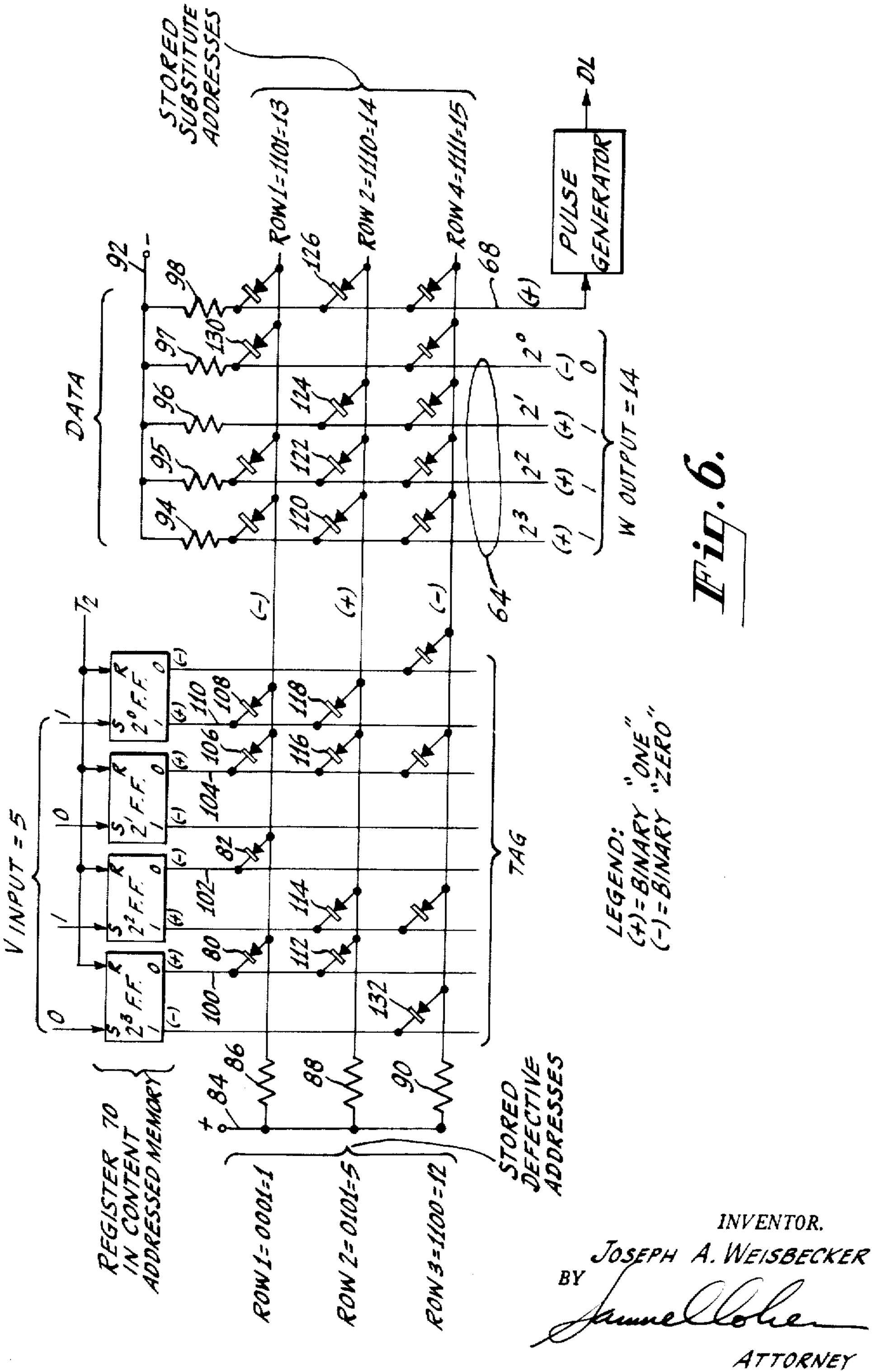
FIG. 6 is a block and schematic circuit diagram of a portion of the content addressed memory shown in FIG. 3.

There are a number of different content addressed memories which may be employed for block 40. However, a portion of one which is relatively simple is illustrated in FIG. 6. The content addressed memory in this instance is illustrated by a decoder-encoder combination made of suitable diode matrices. Although in practice the address word may be 20, 30 or more bits long, for the purpose of illustration, it is assumed that the address word has only four bits. It is also assumed that the addresses 1, 5 and 12 (corresponding to binary addresses 0001, 0101, and 1100, respectively) are defective. It is also assumed that the substitute addresses for 1, 5 and 12 are 13 (binary 1101), 14 (binary 1110) and 15 (binary 1111), respectively.

The content addressed memory of FIG. 6 includes an input register 70. This consists of four flip-flops legended the $2^0$, $2^1$ and so on flip-flops. Each flip-flop stores a binary bit of different rank as is indicated by the legends. The memory also includes a tag portion and a data portion. Each is a diode matrix.

The matrix for the tag portion of the memory includes column leads and row leads. The 1 and 0 output terminals of the flip-flops are connected to the column leads. The number of row leads is made equal to the number of defective words in the memory. Diodes such as 80, 82 and so on are permanently connected between various column and row leads in a manner to be discussed more fully shortly. A source of positive voltage is applied from terminal 84 through load resistors 86, 88 and 90 to the row leads.

The data portion of the content addressed memory also includes a diode matrix. The diodes are connected between various column and row leads in order to simulate the substitute addresses, as will be explained shortly. A source of negative voltage is applied from terminal 92 and through load resistors 94–98 to the column leads.

Row 1 of the tag matrix simulates the binary word 0001. This is done by connecting a diode 80 between the 0 output lead 100, and the row 1 lead, a diode 82 between the 0 output lead 102 and the row 1 lead, a diode 106 between the 0 output lead 104 and the row 1 lead, and a diode 108 between the 1 output lead 110 and the row 1 lead. In a similar manner, diodes are connected to rows 2 and 3 to simulate the defective addresses 0101 (5) and 1100 (12).

The operation of the content addressed memory is illustrated by assuming an input word 0101. This represents a defective memory location 5. The input word produces the voltage configuration shown at the output of the flip-flops. In other words, the $2^2$ and $2^0$ flip-flops are set whereas the $2^1$ and $2^3$ flip-flops remain reset. A positive voltage is applied to the cathode of diode 112. Accordingly, this diode does not conduct. In a similar manner, positive voltages are applied to the cathodes of diode 114, 116 and 118. Therefore, none of these diodes in row 2 of the tag portion of the memory conduct.

The positive voltage available at terminal 84 now appears on the row 2 lead. This positive voltage causes diodes 120, 122 and 124 to conduct so that a positive voltage appears at the $2^1$, the $2^2$ and the $2^3$ output terminals of the data portion of the memory. As will be shown shortly, a negative voltage appears at the $2^0$ output lead of the data portion of the memory. Accordingly, the binary word appearing on bus 64 at the W output of the memory is 1110=14—the substitute address for the defective address 5.

At the same time that the output 14 appears, the diode 126 conducts and a positive voltage appears at output lead 68. This positive voltage is applied to the pulse generator 42 and it results in the generation of an output pulse DL.

As already discussed, the first row of the tag portion of the memory represents the binary word 0001. Diode 82 of this word is connected with its cathode to the negative lead 102 and with its anode through load resistor 86 to the positive terminal 84. This diode, therefore, conducts in response to an input 0101 to the content addressed memory. When diode 82 conducts, it provides a relatively low impedance between the row 1 lead and lead 102. Accordingly, a negative voltage appears on the row 1 lead. This cuts off diode 130 which is in row 1 of the data portion of the memory. The negative voltage appearing on terminal 92 is applied through resistor 97 to the $2^0$ output lead of the data portion of the memory.

It may be observed that diode 132 in row 3 of the tag portion of the memory conducts when the input word 0101 is applied to the register. Accordingly, the row 3 lead of the memory also carries a negative voltage.

There is a diode connected between each row lead and lead 68 in the data portion of the memory. This means that any time the content addressed memory is addressed with a word which is stored in the tag portion of the memory, a positive voltage appears on lead 68. In other words, any time there is a defective address, a pulse DL is produced.

What is claimed is:

1. A memory having a plurality of good storage locations and some defective storage locations; a storage medium which stores the addresses of all of said defective locations; means for applying an address word to the memory; and means for comparing said address word with all words stored in said storage medium and, if an equality exists, applying to the memory a substitute address word corresponding to a good storage location in the memory.

2. A random access memory having a plurality of good storage locations and some defective storage locations; a content addressed memory which stores the addresses of all of said defective locations, and substitute addresses for the addresses of the defective locations; means for applying an address word both to the random access memory and the content addressed memory, for deriving a substitute address word from the content addressed memory when the applied address word is in the content addressed memory; and means for applying the substitute address word to the random access memory.

3. In combination, a data memory; a content addressed memory; a circuit for applying an address word to both memories; and a circuit for applying a substitute address word from the content addressed memory to the data memory when the address word corresponds to a defective storage location in the data memory.

4. In combination with a memory having a given read-write memory cycle, means responsive to an address which corresponds to a good storage location in the memory for reading the word at that address from the memory during said read portion of said cycle, and then storing a word at that address in said write portion of the cycle; and means responsive to an address which corresponds to a defective storage location for first addressing the memory with said address during the read portion of said cycle, then addressing the memory with a substitute address during an additional read portion of said cycle, then writing a word in said substitute address during a write portion of said cycle.

5. In combination, a random access memory; means responsive to an address word corresponding to a good storage location in the memory for reading out the contents of that location during one fixed time increment, and for writing into said location during a second equal time increment; and means responsive to an address word corresponding to a defective storage location in the memory for addressing the memory with the defective address during one fixed time increment, for reading out the contents of a substitute storage location during a second equal time increment, and for writing into said substitute storage location during a third equal time increment.

6. In a data processing system, memory means including a first portion having a plurality of good storage locations and a plurality of defective storage locations, and a second portion for storing the addresses of the defective storage locations;

means for providing a memory address word; and means for comparing said address word with the stored addresses of the defective storage locations and, if no equality exists, applying said address word to said first portion of said memory means and, if an equality exists, applying to the first portion of the memory means a substitute address word corresponding to a good storage location in said memory means.

7. In a data processing system, memory means including a first portion having a plurality of good storage locations and a plurality of defective storage locations, and a second portion for storing good addresses to substitute for the addresses of said defective storage locations; and means responsive to an original address word applied to said memory means for applying said original address word to said first portion of said memory means if it corresponds to a good storage location therein, and for applying to the first portion of the memory means a substitute address word taken from the second portion of the memory means when the original address word corresponds to a defective storage location in said memory means.

8. In a data processing system, memory means including a first portion having a plurality of good storage locations and a plurality of defective storage locations and a second portion for storing the addresses of the defective storage locations and substitute good storage location addresses;

means for applying an address word to said second portion of said memory means; and means for comparing said address word with the stored addresses of the defective storage locations and, if no equality exists, applying said address word to said first portion of said memory means and, if equality exists, applying to the first portion of the memory means a substitute address word taken from the second portion of the memory means and corresponding to a good storage location in said memory means.

9. Memory means having a plurality of good storage locations and some defective storage locations, and including one portion for storing the addresses of said defective storage locations;

means providing a memory address; and means for comparing said memory address with the addresses stored in said one portion of said memory and, if an equality exists, changing said memory address to an address corresponding to a good storage location in said memory means.

10. In combination:

a random access memory having a plurality of storage locations into which information may be written and from which information may be read and a plurality of other storage locations into which it is desired that information not be written;

a content-addressed memory which stores the addresses of said other storage locations;

means for applying an address word to the content-addressed memory for deriving a substitute address word therefrom when the applied address word corresponds to an address stored in the content-addressed memory; and means for applying said substitute address word to said random access memory.

11. In combination:

a data memory;

a content-addressed memory for storing the addresses of locations in the data memory into which information is not to be written;

a circuit for applying an address word to the content-addressed memory;

a circuit for deriving a substitute address word from the content-addressed memory when the address word corresponds to an address stored in the content-addressed memory.

References Cited by the Examiner

UNITED STATES PATENTS 3,045,217 7/1962 Housman et al. -- 340—172.5 X
3,093,814 6/1963 Wagner et al. ------ 340—172.5

ROBERT C. BAILEY, *Primary Examiner.*

MALCOLM A. MORRISON, *Examiner.*